2 Sheets--Sheet 1.
H. SMITH & D. B. WESSON,
Ass'nr by mesne assignments to WINCHESTER REPEATING ARMS CO.
Breech-Loading and Repeating Fire-Arms.
No. 5,710. Reissued Dec. 30, 1873.
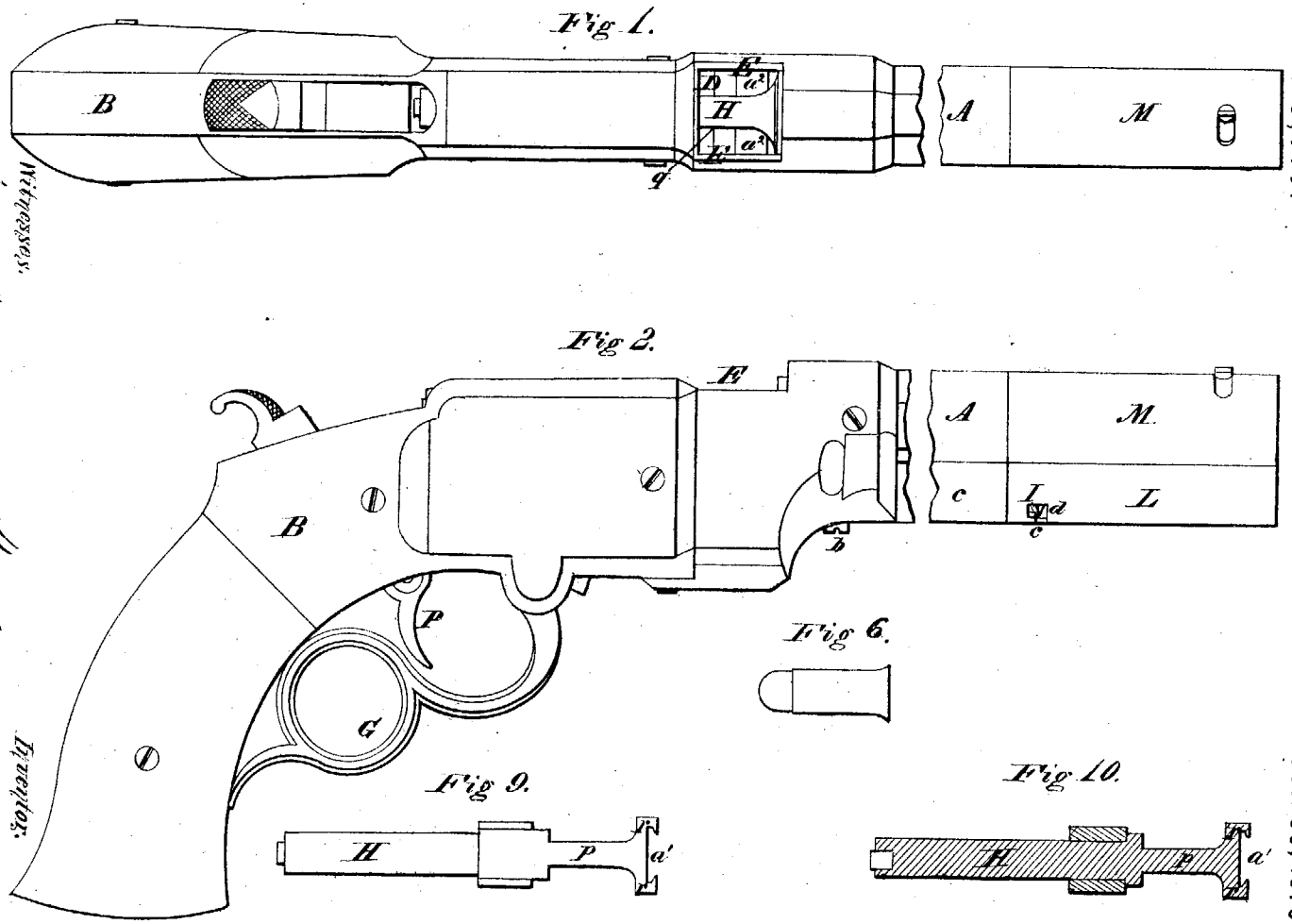
Witnesses.
Harry King.
H. H. Dodge.
Inventor.
Winchester Repeating Arms Co.
Assignee of Smith & Wesson
by Dodge & Son
Attys.
AM. PHOTO-LITHOGRAPHIC CO. N.Y. (OSBORNE'S PROCESS)

2 Sheets--Sheet 2
H. SMITH & D. B. WESSON,
Ass'nr by mesne assignments to WINCHESTER REPEATING ARMS CO.
Breech-Loading and Repeating Fire-Arms.
No. 5,710. Reissued Dec. 30, 1873.
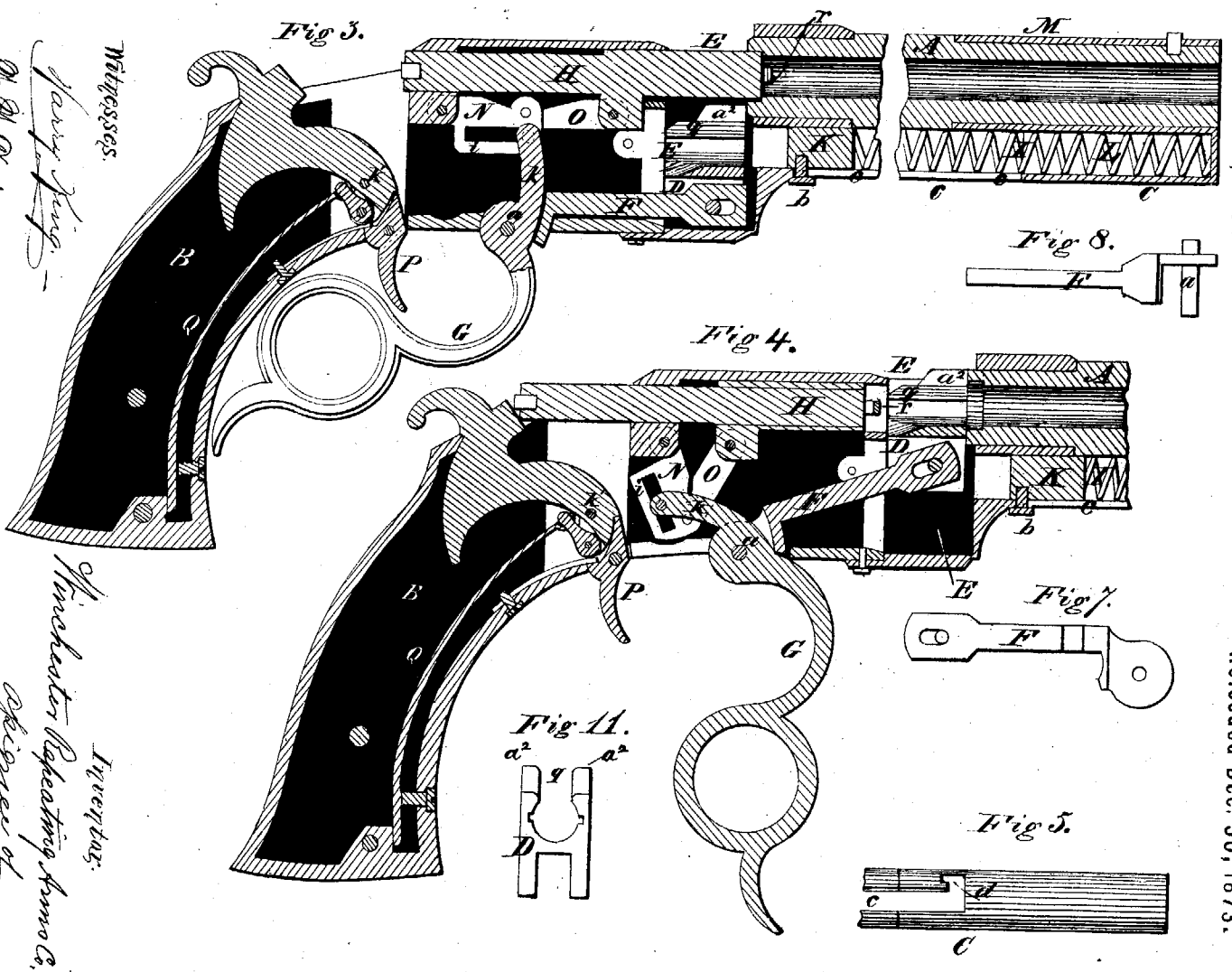
Witnesses.
Harry King.
H. H. Dodge.
Inventor.
Winchester Repeating Arms Co.
assignee of
Smith & Wesson.
by Dodge & Son
Attys.
AM. PHOTO-LITHOGRAPHIC Co. N.Y. (OSBORNE'S PROCESS)

UNITED STATES PATENT OFFICE.

HORACE SMITH AND DANIEL B. WESSON, OF SPRINGFIELD, MASSACHUSETTS, ASSIGNORS, BY MESNE ASSIGNMENTS, TO WINCHESTER REPEATING-ARMS COMPANY, OF NEW HAVEN, CONNECTICUT.

IMPROVEMENT IN BREECH-LOADING AND REPEATING FIRE-ARMS.

Specification forming part of Letters Patent No. 10,535, dated February 14, 1854; reissue No. 279, dated October 10, 1854; extended seven years; reissue No. 5,710, dated December 30, 1873; application filed November 21, 1873.

*To all whom it may concern:*

Be it known that HORACE SMITH and DANIEL B. WESSON, formerly of Norwich, in the county of New London and State of Connecticut, now of Springfield, Massachusetts, did invent certain new and useful Improvements in Fire-Arms; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use the invention, I will proceed to describe it.

This invention relates to fire-arms, and it consists in a novel construction of certain of the parts of the arm; and it also consists in a novel combination of elements or devices, whereby the arm, or a magazine attached thereto, can be supplied with a quantity of metallic cartridges ready prepared for firing, and said cartridges be transferred successively from the magazine to the barrel, be there fired, the empty shell (or the cartridge, if not fired) be then withdrawn from the barrel, then be released from the extractor and expelled from the arm, and the breech opened and closed, all by a movement to and fro of an operating-lever, as hereinafter more fully explained.

Figure 1 is a top-plan view. Fig. 2 is a side elevation. Fig. 3 is a longitudinal section, showing the breech closed and the hammer cocked ready for firing. Fig. 4 is a similar view, showing the breech opened and the shell expelled. Figs. 5, 6, 7, 8, 9, 10, and 11 are views of portions shown detached and more in detail.

This arm belongs to that class technically known as magazine or repeating arms. Such arms have heretofore been made, but not so as to use metallic cartridges, the shells of which had to be withdrawn, nor so as to cock the hammer by the movement of the operating-lever. Nor has any arm heretofore been so constructed as to first withdraw the cartridge, or its shell, from the barrel, and then expel the same from the arm.

In the drawings above referred to, A denotes the barrel of the piece, and B the stock or lock-case. Underneath the barrel is a long tube, C, that serves as a magazine for carrying the cartridges. This magazine and barrel have at their rear ends a carrier or slide-block, D, whose office is to receive a cartridge from the magazine and transfer or raise it up into line with the barrel. For this purpose the said carrier is caused to slide up and down within a chamber, E, and to be moved by a lever, F, that plays or turns on a fulcrum, *a*, with the operating-lever G, which, in this case, is also made to turn on the same pin *a*. A sliding breech-piece, H, is also employed to force the cartridge out of the carrier (when the latter is raised to its highest position) and into the barrel. The cartridges are placed one after another in the magazine, and are pressed toward the carrier by means of a helical spring, I, that bears against a cylindrical follower, K, from which a screw-pin, *b*, projects, and extends into and through a long slot, *c*, that is made lengthwise in the magazine, and opens into another and short slot, *d*, that is cut through a spring chamber or tube, L, which is so applied to the barrel, by means of a clasping-sleeve, M, as to be capable of being turned laterally entirely out of line with the magazine, so as to permit the latter to be supplied with cartridges whenever necessary. The slot *d* of the magazine is turned, at its upper end, at right angles to the main part; thence it is turned down a short distance parallel to such main part, the whole being as represented in Fig. 5, for the purpose of confining the spring within the chamber in a contracted state. By applying the finger to the head of the screw *b*, and pushing the follower K toward the spring I, we can crowd the spring entirely into the chamber L, and so as to carry the screw *b* to the upper part of the slot *d*. When this is the case, if we press the screw laterally into the lateral part of the groove, the spring may be preserved in place in the chamber, while such chamber is turned out of line with the magazine-tube. The breech-piece H is operated, or moved back and forth, by toggle-joints N O, that are worked by the operating-lever G, the position of the several parts of the fire-arm, when the longer arm of the operating-lever is moved entirely forward or away from the stock, being represented in Fig. 6, which represents a longitudinal section of the arm under such circumstances. The toggles are jointed to the breech-piece H and the lock-frame. They are moved up and down by the short arm *k* of the operating-lever G, projecting upward from its fulcrum, and provided with one or more studs to enter and slide in a slot, *i*, formed through, or affixed to, the back toggles. When the toggles are brought into a straight line with each other, the breech-block H is hard up against the rear end of the cartridge, and serves as a breech to the barrel. Fig. 9 denotes a top view of the breech-piece H. Fig. 10 is a horizontal and central section of it. This breech-piece H is made with a head or end of suitable shape to pass through the carrier and close the rear end of the bore of the barrel when forced against it. In rear of this head the breech-piece is reduced in width, as seen at *p* in Figs. 9 and 10, it being so reduced for a distance at least equal to the length of the carrier D, and for the purpose of passing out of the opening *q*, made through the top of the carrier and leading out of its cartridge-chamber. The front end of the said breech-piece is formed with a flat end or face, $a^1$, to fit against the rear end of the cartridge-shell and hold it in the bore; and from this face $a^1$, at each side, projects a hook, *r*, as represented in Figs. 9 and 10, these hooks having their points turned inward, and placed at such distance asunder that when the breech is closed they will ride forward past the enlarged head or base of the cartridge-shell and inclose it between them. The blow of the hammer against the rear of the breech-piece H causes its front end to upset the rear end of the cartridge-shell, thereby causing the latter to expand laterally and engage with the hooks *r*, which thus grasp and hold it with sufficient force to withdraw it from the chamber of the barrel when the breech-piece or piston is next retracted or forced back by the operating-lever. Having withdrawn the remainder of the cartridge from the barrel, and over the projections $a^2$ $a^2$ (see Figs. 1, 3, 4) on the carrier, these projections $a^2$ are forced into such contact with the remainder of shell, and by and during the next upward movement of the carrier, as to expel it from the piece or fire-arm. These projections constitute the boundaries of the opening *q*, and they perform an important function, namely, the expulsion from the chamber E of the remainder of the cartridge, or that part of it which is drawn from the barrel by the hooks *r r* after a discharge, and previous to the introduction of the next cartridge into the barrel. The construction of the carrier so that it may not only pass down by the breech-piece and to the magazine while the breech-piece is up against the barrel, but so that it will expel the remainder of the cartridge extracted from the barrel, constitutes an important feature of this improved fire-arm. The cock or percussion-hammer is arranged in rear of the breech-piece H and turns on a pin, *k'*, and is made to strike directly against the rear end of the breech-piece H and to inflame the priming by the concussion produced by its percussion or blow on such end. The trigger is shown at P, and the mainspring at Q. This cock or percussion-hammer is also so arranged that it shall be elevated or set to full-cock by the back pressure on it of the breech-piece H, induced by the toggles, which are moved by the operating-lever when the latter is moved away from the stock. Thus the operating-lever, when so moved, is made to simultaneously cause the hammer to be cocked, the breech-piece to be forced back, and the carrier to be elevated. The carrier-lever is elevated by means of the lower arm of the operating-lever G and depressed by the upper arm thereof, the carrier-lever being so shaped, as seen in Figs. 7 and 8, which are side and top views of it, and so applied to the operating-lever, as to enable the latter to actuate it. It will thus be seen that, by this combination of elements or devices, the entire series of operations for opening and closing the breech, releasing and expelling the cartridge-shell, and cocking the arm, as also for bringing a fresh cartridge up from the magazine and placing it in the chamber of the barrel, are performed by the hand of the operator on one lever, and that this lever also locks the breech closed during the act of firing. It will also be further seen that after the shell is drawn out of the chamber it is thrown clear from the arm by the carrier, which is raised by the movement of the operating-lever in opening the breech, no other movement being required for that purpose.

I do not claim as the invention of said SMITH & WESSON the employment of a carrier or slide for transferring the cartridge from the magazine to the barrel, nor the employment in combination therewith of a sliding breech-piece to force the cartridge out of the carrier and into the barrel; nor the employment of the piston-slide H as a breech to the barrel; nor the firing by concussion instead of percussion; nor the improvement of making or applying the percussion-hammer so as to strike on the rear end of a small pin, instead of directly against its cartridge or priming, and so that the priming at the front or lower end of the pin shall be exploded by concussion produced by the percussive blow of the hammer on the other end of it; but What I do claim as their invention is—

1. The combination of the percussion-hammer, the sliding breech-piece, and the barrel, substantially as described, whereby the breech-piece H shall serve both as a breech to hold the cartridge in the barrel, and as a means of conveying the force of the blow of the hammer to the cartridge, substantially as set forth.

2. In combination with an extractor for drawing the shell out of the chamber, a device arranged to strike the shell or cartridge and expel the same from the arm, substantially as described.

3. The combination of the sliding breech-piece H and the carrier D, constructed substantially as described, whereby the carrier can be operated while the breech is closed, and also be made to expel the shell while being raised, as set forth.

4. The combination of the hammer and the breech-piece H with the operating-lever G, whereby the hammer may be cocked by the movement of the operating-lever, substantially as described.

5. A reciprocating breech-piece arranged to move in line with the bore of the barrel, in combination with an extractor which advances from behind the cartridge to engage therewith, for the purpose of withdrawing the shell from the barrel when the breech is opened.

6. The combination, in a breech-loading arm, of a hammer, a reciprocating breech-piece, and an extractor with an operating-lever, the said parts being arranged to operate substantially as described, whereby the movement of said lever shall open the breech, cock the hammer, and withdraw the shell, as set forth.

7. The combination, substantially as described, of a barrel open at its rear end with a reciprocating breech-piece moving in line with the bore of the barrel, and an extractor arranged to advance from behind the cartridge, to engage with and extract the shell.

8. In combination with a barrel open at the rear, a device arranged to operate on the shell as it is withdrawn from its chamber, and expel it from the arm, the combination being substantially such as described.

9. The combination, substantially as described, of an operating-lever, an extractor, and a device arranged to operate on the shell after the breech is opened and expel it from the arm, substantially as set forth.

10. The combination, substantially as described, of an operating-lever with a hammer, breech-piece, and extractor, whereby the movement of the lever once forward and back will open and close the breech, cock the gun, and withdraw the cartridge-shell.

11. The combination, substantially as described, of an operating-lever with a hammer, closing breech-piece, extractor, and a device for throwing out the shell, whereby the motion forward and back of the lever will open and close the breech, cock the gun, withdraw the shell, and expel it from the arm.

OLIVER F. WINCHESTER,
*President Winchester Repeating-Arms Co.*

Witnesses:
W. W. WINCHESTER,
T. L. BENNETT.